United States Patent [19]

Suzuki

[11] Patent Number: 4,812,879
[45] Date of Patent: Mar. 14, 1989

[54] AUTOMATIC PHOTOGRAPHIC PRINTING APPARATUS WITH SIMULATOR AND METHOD OF ADJUSTING SIMULATOR OF AUTOMATIC PHOTOGRAPHIC PRINTING APPARATUS

[75] Inventor: Kenji Suzuki, Kanagawa, Japan

[73] Assignee: Fuji Photo Film Co., Ltd., Kanagawa, Japan

[21] Appl. No.: 79,069

[22] Filed: Jul. 29, 1987

[30] Foreign Application Priority Data

| Jul. 29, 1986 | [JP] | Japan | 61-178293 |
| Aug. 6, 1986 | [JP] | Japan | 61-184884 |
| Aug. 6, 1986 | [JP] | Japan | 61-184886 |
| Aug. 19, 1986 | [JP] | Japan | 61-193048 |
| Sep. 16, 1986 | [JP] | Japan | 61-217643 |
| Sep. 17, 1986 | [JP] | Japan | 61-218693 |
| Sep. 26, 1986 | [JP] | Japan | 61-227378 |
| Oct. 15, 1986 | [JP] | Japan | 61-245090 |
| Nov. 26, 1986 | [JP] | Japan | 61-281536 |
| Jun. 18, 1987 | [JP] | Japan | 62-152161 |

[51] Int. Cl.$^4$ ........................................... G03B 27/80
[52] U.S. Cl. ........................................ 355/38; 355/68; 355/77
[58] Field of Search ............... 355/38, 68, 77; 358/76, 358/78, 80

[56] References Cited

U.S. PATENT DOCUMENTS

| 4,310,848 | 1/1982 | Carter et al. | 358/76 |
| 4,364,084 | 12/1982 | Akimoto et al. | 358/76 |

*Primary Examiner*—L. T. Hix
*Assistant Examiner*—D. Rutledge
*Attorney, Agent, or Firm*—Sughrue, Mion, Zinn, Macpeak & Seas

[57] ABSTRACT

An automatic photographic printing apparatus for printing an image in a negative color film on a photographic paper and having a simulator for displaying this image as a positive image comprises an imaging device for imaging the negative film, a display device for displaying the positive image, and an image information processing unit for matching the coloring characteristics of the photographic paper and of the display device.

A method of adjusting the simulator comprises the steps of imaging a standard negative film using the imaging device and adjusting the outputs of the imaging device such that they correspond to the density of the standard negative film.

24 Claims, 8 Drawing Sheets

AUTOMATIC PHOTOGRAPHIC PRINTING APPARATUS WITH SIMULATOR AND METHOD OF ADJUSTING SIMULATOR OF AUTOMATIC PHOTOGRAPHIC PRINTING APPARATUS

BACKGROUND OF THE INVENTION

1. Field of the Invention

The present invention relates to an automatic photographic printing apparatus with a simulator and a method of adjusting the simulator, and more particularly, to a simulator which is capable of displaying on a CRT display an image which is to be printed on a photographic paper by an automatic photographic color printing apparatus, and an adjusting method therefor.

2. Description of the Prior Art

Automatic photographic color printing apparatuses have been known in which a negative color film is printed and then developed such that all of its print copies have the same photographic density and color balance irrespective of the density of the negative film (an underexposed, optimum-exposed or overexposed negative) by correcting the density using the integral transmission density (LATD) of the entire image in the negative color film and by performing the slope control thereon. Such an automatic photographic color printing apparatus generally comprises a light source, a light adjusting filter, a mirror box, a negative carrier, and an optical system having a black shutter, which are aligned in the apparatus in that order. In order to print a negative color film, the negative color film supported by the negative carrier is irradiated by the light source, and the black shutter is opened for a predetermined period of time (the exposure time is made constant) so that the image in the negative color film is formed on a sheet of photographic paper. The photographic paper on which the image of the color negative has been formed is then automatically developed by a developing process so that it becomes a print copy. In the automatic photographic printing apparatus of this type, the light transmitted through the negative is broken down into primary colors including red light (R), green light (G), and blue light (B) by the light receiving element. The density of each primary color is controlled using the LATD on the basis of Theorem of Evans, while the slopes of these three primary colors are controlled such that they have the same slope, so as to control the color balance. Thus, print copies prepared by this automatic photographic printing apparatus have the same density and color balance.

However, if the major subject in the color negative has the optimum density but the density of its background is higher or lower, this density of the background affects the exposure, resulting in density failure. The difference in color balance between the major subject and the background, e.g., the complementary relationship between the colors of the major subject and the background, produces color failure. In such a case, density compensation or slope control will not ensure a print copy of excellent quality, and the negative must be printed and developed again.

To obviate this problem, Japanese Patent Laid-Open No. 46731/1978 discloses a photographic inspection device provided with a simulator which is capable of displaying on a TV screen the image in a negative which is reproduced via a TV camera. In this device, the color video signals are adjusted such that the image displayed on the TV screen has a desired density and color balance, and these adjusted color video signals are employed to print the negative in an automatic photographic printing apparatus. Further, in the automatic photographic printing apparatus disclosed in the specification of Japanese Patent Publication No. 25220/1967, the image in a negative which is to be printed on the photographic paper is displayed on a TV screen, and the automatic exposure device is coupled to the resistor for adjusting the brightness and contrast of the TV. In either case, the image is simulated so as to reduce the frequency with which a reprinting and redeveloping process has to be resorted to.

However, in the method employing the photographic inspection device, the automatic photographic printing apparatus and the inspection device employ separate light sources. In consequence, even if the information obtained from the inspection device is employed to allow a print copy to be provided by the automatic photographic printing apparatus, the image formed on the photographic paper will not be the same as that displayed on the TV screen due to the use of different light sources and it is difficult to adjust both the light sources of the automatic photographic printing apparatus and the inspection apparatus to the same conditions and maintain the conditions.

Also, since the automatic photographic printing apparatus and the inspection device are independent from each other, after the exposure conditions in the former are determined the latter must be adjusted such that the exposure conditions in the latter coincides with those in the former. Such an adjustment requires much time and it is much difficult to conduct the adjustment accurately, resulting in a deterioration in simulating performance. Further, in a photographic printing apparatus in which the automatic exposure device is coupled to the resistor for adjusting the brightness and contrast of the TV, the TV signals are merely controlled such that an image displayed on the TV screen is appropriate even though the coloring characteristics of the TV are different from those of the photographic paper. Therefore, the image which is to be printed cannot be displayed on the TV screen.

The conventional TV has $\gamma$ of about 2.2, and this is corrected by providing a camera with a $\gamma$ correcting circuit which has $\gamma=0.45$, by which the $\gamma$ of the entire apparatus to set to 1. On the other hand, the print copy tends to have a soft tone of $\gamma=2.0$ so that it looks impressive, and it has therefore been necessary to provide a simulator with a $\gamma$ correcting circuit which corrects the $\gamma$ to 2.0 in correspondence with the $\gamma$ characteristics of the photographic paper. As a result, the $\gamma$ (about 0.6) of the negative is first decreased by the correcting circuit in the camera and is then increased by the $\gamma$ correcting circuit in the simulator. This leads to degradation of the SN ratio and to deterioration of the quality of the image on the TV. Further, two $\gamma$ correcting circuits are necessary, one in a camera and the other in a simulator, resulting in an increase in production costs.

In the case of printing an extremely underexposed or overexposed negative in an automatic photographic printing apparatus, the amount of light to be adjusted may exceed the adjustable range of the filter. In such a case, the exposure time is decreased or increased by means of a black shutter. When the exposure time is controlled by the black shutter, the intensity of light is not changed by the filter, and an image which is to be printed on a photographic paper cannot be displayed when the color negative film is imaged.

In a case where the exposure time is made to be very long, the length of exposure time is determined with the irregularity of reciprocity rule taken into consideration. This makes the image to be printed and to be displayed even more different from each other.

Furthermore, since the camera has a spectral sensitivity which differs from that of the photographic paper, the overlapping portions of the three primaries in the image reproduced via the camera are not exactly the same as those in the image printed on the photographic paper. Therefore, even after differences in the spectral sensitivities of the camera and the photographic paper have been electrically compensated for, color reproduction or color balance is deteriorated due to this difference in the overlapping portions. More specifically, photographic paper has a low sensitivity to red light, and, in order to compensate for this effect, the light from the light source has the spectral intensity characteristics shown by a curve H in FIG. 9, in which the intensity of red light is large. The base portion (the non-exposed portion) of the negative has the absorption characteristics shown by a curve I in FIG. 9, so it absorbs blue and green light to a larger extent. As a result, when the base portion of the negative is irradiated by the light source, the light transmitted through the base portion of the negative has the spectral intensity characteristics shown by a curve J in FIG. 9. The base portion of the negative in this state is grey when printed onto the photographic paper. However, the intensity of red light (of wavelengths of about 500 mn to 700 nm) is large, and the peak wavelength of this red light is about 680 nm. On the other hand, the imaging device (a single-board camera employing a mosaic filter) has a spectral sensitivity as shown by the spectral sensitivity curve in FIG. 10, in which red and green light, and green and blue light are mixed by a large extent, and the peak wavelength of the red light is about 600 nm. As a result, when the color negative irradiated by this light source is imaged by the imaging device and displayed on the simulator, the three primary colors are mixed to a large extent. The peak wavelength of the red light of the imaging device does not match that of the red light of the negative-light source system, reducing the quality of the color reproduction. Also, the intensity of the red light of the negative-light source system is large, and the output for the red light of the imaging device may be saturated, lowering the quality of the color balance.

SUMMARY OF THE INVENTION

Accordingly, a primary object of this invention is to provide an automatic photographic printing apparatus with a simulator which is capable of displaying on a display device an image which is to be formed on a print copy.

A further object of this invention is to provide a method of adjusting a simulator of an automatic photographic printing apparatus which is capable of displaying an image which is to be formed on a print copy even when the exposure time of a shutter is varied.

A still further object of this invention is to provide at a low production cost a simulator of an automatic photographic printing apparatus which ensures a SN ratio of an excellent value.

Another object of this invention is to provide a simulator of an automatic photographic printing apparatus which allows the spectral sensitivity of a camera to be approached to that of a photographic paper so as to improve the color reproduction and color balance.

To achieve these objects, the present invention provides an automatic photographic printing apparatus including a light source for irradiating rays of light onto a negative color film through a light adjusting filter, an optical system disposed at the side of the negative color film to which rays of light are transmitted through the negative color film for forming the image recorded on the negative color film on a photographic paper, an exposure control device for controlling the light adjusting filter so as to adjust the color balance and density of the image to be formed on the photographic paper, such that the negative color film is automatically printed in such a manner that print copies thereof have the same color balance and density, comprising: an imaging device for imaging the negative color film which has a color balance and a density adjusted by the light adjusting filter from the light transmitted side of the negative color film; and an image information processing unit for converting the output of the imaging device in such a manner that the coloring characteristics of the display device corresponds to those of the photographic paper and displaying it on the display device.

According to the present invention, the light from the light source is irradiated on the photographic paper through the light adjusting filter, negative color film and optical system so as to form the image stored in the negative color film on the photographic paper. The exposure device controls the light adjusting filter and thereby adjusts the color balance and density of the image which is to be formed on the photographic paper, so that print copies have the same color balance and density. The exposure of the photographic paper is thus performed after the color balance and density of the image have been adjusted. The exposed photographic paper is then developed by a developing process to obtain print copies. The image device images the negative color film from the light transmitted side thereof, and the image information processing unit converts the signals produced by the imaging device and carrying information on the image which has the adjusted color balance and density, in such a manner that the image displayed on the display device has the same coloring characteristics as those of the photographic paper. The thus-converted signals are employed to display the image in the negative on the display device. Since the density and the color balance are adjusted by the exposure control device, the display device can display an image which has the coloring characteristics corresponding to those of the print copy without adjustment of the color balance and density by the image information processing unit, that is, the display device can display an image which is to be formed on a print copy.

In the present invention, image in the negative color film is displayed on the display device after the color balance and the density thereof have been adjusted. Also, It is displayed on the display device using signals which are converted in such a manner that the image represented by the signals has the coloring characteristics which corresponds to those of the photographic paper. Therefore, an image which is to be formed on a print copy can be displayed on the display device. This display makes it possibble for the image which is to be formed on a print copy to be visualized before the development of the exposed photographic paper, and an inappropriate printing and developing can be thereby easily found. Further, since the the density and color balance of the image have been adjusted before the negative film is imaged by the imaging device, accurate measurement with an imaging device having a narrow dynamic range is possible. Functions for adjusting the density or other factors are specially designed. Therefore, they have a simple structure, and the production cost thereof can be thereby reduced.

In the present invention, it is necessary to set the exposure conditions of the automatic exposure control function only in the automatic photographic printing apparatus but it is unnecessary to do that in the simulator. Also, since the light source adjusted by the automatic exposure control function is utilized in both the automatic photographic printing apparatus and the simulator, the slope control, the correction control, the density control, the light source deviation correcting control and so on conducted in the automatic photographic printing apparatus are also applied in simulator, so that the image can be simulated in a high accuracy.

The present invention also provides a method of adjusting a simulator provided in a automatic photographic printing apparatus for printing onto photographic paper an image in a negative color film irradiated by light adjusted by an automatic exposure control function, the simulator imaging the negative color film irradiated by the light using an imaging device, the imaging device breaking down received light into three primary colors and outputting electrical signals corresponding to the three primary colors, the simulator converting the output of the imaging device and displaying it as a positive image, comprising the steps of:

imaging a reference negative film using the imaging device; and adjusting the gain of the electrical signals so that the output of the imaging device corresponds to the density of the reference negative film.

The simulator of this invention employs an imaging device which breaks down received light into three primary colors and outputs electrical signals corresponding to these three primary colors. It images the negative color film irradiated by the light from a light source which is adjusted by the automatic exposure control function of the automatic photographic printing apparatus, using this imaging device, then converts the output of the imaging device and displays it as a positive image. The output of this imaging device is adjusted first by imaging a standard negative and then by adjusting the electrical signals produced by the imaging device so that the output thereof corresponds to the density of the reference negative. A reference negative may be prepared by developing an unexposed film (a so-called transparent negative), or it may be negative (a bull's eye negative) having a portion corresponding to a negative which carries an image of a grey subject as well as a portion corresponding to a negative carrying an image of a yellow green subject, the latter portion surrounding the former portion. More specifically, if a transparent negative is employed as the reference negative, the gain of the electrical signals is adjusted such that the levels of all the electrical signals corresponding to the three primary colors are at the white level (or 90% of the white level). The transparent negative has the largest light transmittance of all negatives, and the imaging device receives the maximum amount of light when it images it. The arrangement is such that the output of the imaging device has a value corresponding to the white level (the maximum value) when it receives the maximum amount of light. The dynamic range of the imaging device can be fully used, if the imaging device has a stop mechanism, that is, a control mechanism of the amount of light which includes control apparatus for a variable aperture or an optical wedge, and the stop mechanism is applied for adjusting brightness. If a normal bull's eye negative is used as the reference negative, it is imaged by the imaging device, and the output of the imaging device is adjusted such that the electrical signal representing each primary color corresponds to the density thereof in the bull's eye negative. When the output of the imaging device is adjusted such that it corresponds to the density of the bull's eye negative, the standard level of the output of the camera is at the grey level. The dynamic range of the imaging device can be thereby fully used if the stop mechanism of the imaging device is utilized.

When the gain of the electrical signals is adjusted such that the output of the imaging device corresponds to the density of the reference negative, it is preferable for the brightness to be adjusted by adjusting the stop mechanism of the imaging device if the imaging device has the stop mechanism, but the brightness can be adjusted electrically if the imaging device is not provided with the stop mechanism. The standard, or reference, of the brightness can be thereby determined. When the gain of the electrical signals is adjusted in the above described manner, if the state of the light source of the automatic photographic printing apparatus shifts from the standard, this shift must be electrically compensated for. It is therefore desirable that this adjustment is performed in the state of the light source wherein the reference grey in the negative is also the reference grey in the print cory.

In this invention, the gain of the electrical signals is adjusted such that the output of the imaging device corresponds to the density of the reference negative. It is therefore possible to set the standard, or reference of the output of the imaging device accurately and automatically.

DESCRIPTION OF THE PREFERRED EMBODIMENTS

A first embodiment of this invention will be described in detail below with reference to the accompanying drawings. The present embodiment is a combination of an automatic photographic color printing apparatus (hereinafter referred to as a printer) and a device (hereinafter referred to as a simulator) for displaying an image in a negative color film in the state wherein it is formed in a print copy prepared by the printer.

Figure 1:
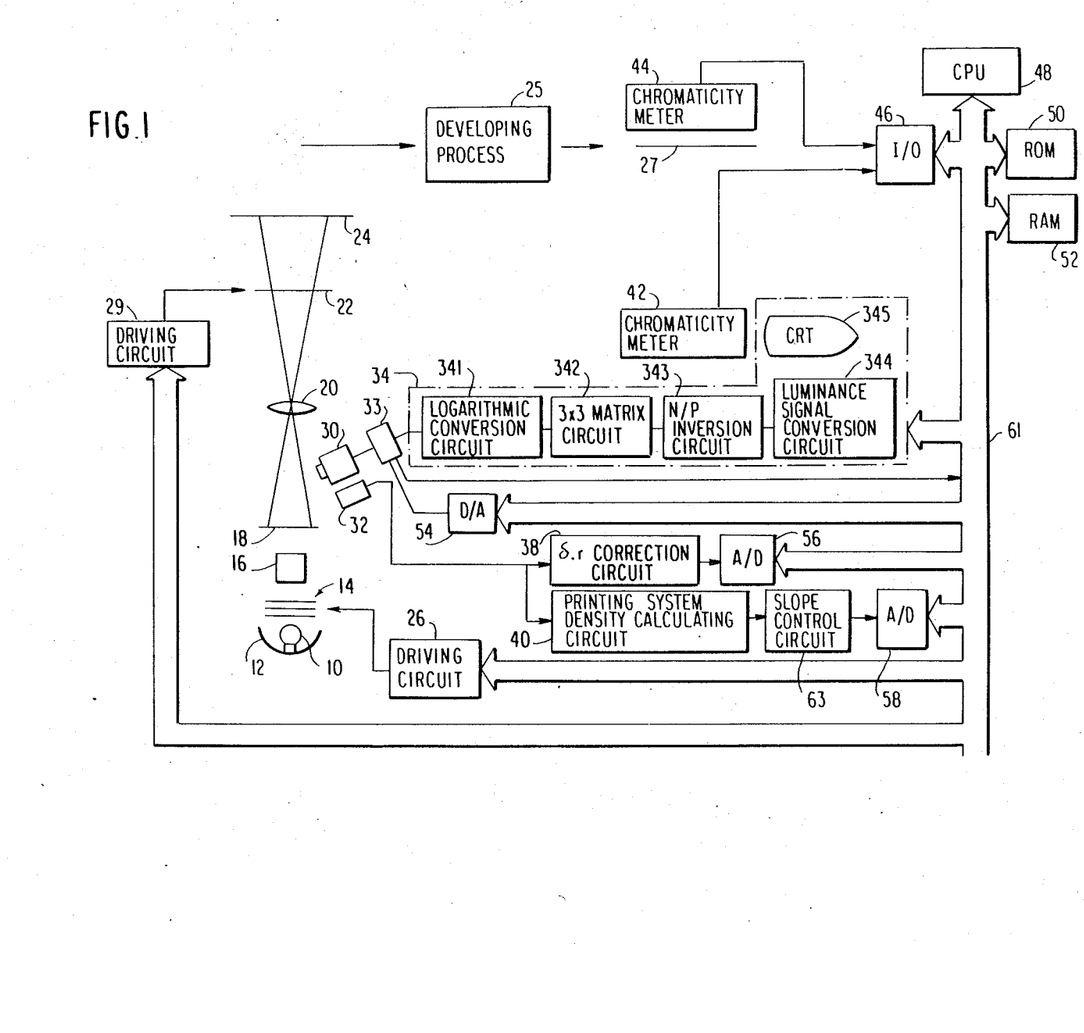
FIG. 1 is a block diagram of a first embodiment of the present invention.

As shown in FIG. 1, a reflecting mirror 12 comprising a cold mirror is disposed behind a light source 10 comprising a halogen lamp. A voltage of about 90% of the rated voltage is supplied to the light source 10 from a power source (not shown) so as to elongate the life thereof and to obtain a predetermined color temperature. At the light irradiated side of the light source 10 are disposed a light adjusting filter 14 and a mirror box 16 having a scattering board. The filter 14 consists of filters of the complementary colors of Y (yellow), M (magenta), and C (cyan). In each filter, a filter plate shaped as a sector of a quadrant which is formed in a logarithmic curve is combined with another filter, and that combination is disposed on right and left sides to make a pair. The color balance and amount of the light irradiated from the light source 10 are adjusted by the light adjusting filter 14, and that adjusted light is then diffused uniformly by the mirror box 16 to be irradiated onto a negative color film 18 supported on a negative carrier. To adjust the voltage of the light source, the filters of the complementary colors in the light adjusting filter are set at the mechanical center, the amount of light is set to a predetermined value (standard, or reference, exposure time) by measuring it by an illuminometer, and the voltage of the light source is set at approximately 90% of the rated voltage. On the side of the negative color film 18 which is remote from the light source are disposed an optical system 20 and a black shutter 22 in that order. The black shutter 22 is opened for a predetermined time so that the image in the negative color film is formed on a photographic paper 24 and so that the photographic paper is exposed by the light transmitted through the negative color film 18. The exposed photographic paper 24 is then developed by a developing process 25 to obtain a print copy 27.

A driving circuit 26 is connected to the light adjusting filter 14. The driving circuit 26 moves the filters of the complementary colors in a direction perpendicular to the optical axis so as to adjust the color balance and the amount of light. A driving circuit 29 is connected to the black shutter 22.

Adjacent to the optical system 20 of the negative color film 18 are disposed a camera 30 constituting an imaging device or an image pick-up device and an image information detecting device 32. The camera 30 is constructed by a three-board camera provided with three filters which respectively transmit R (red) light, G (green) light, and B (blue) light as well as a stop mechanism (iris), and which outputs R, G, and B signals. The image information detecting device 32 includes a two-dimensional image sensor for detecting image density information on the three primary colors of R, G, and B. The two-dimensional image sensor is constructed by a CCD (charge coupled device). The camera 30 may be constructed by a CCD single-board camera which is to be described later as a second embodiment.

In an usual TV system, the $\gamma$ of the TV is set at about 2.2 to make the images clearer. This is therefore made to be 1 by providing a camera with a $\gamma$ correcting circuit which has a $\gamma=0.45$. The normal print copy has a soft tone with $\gamma$ of about 2.0, i.e., the $\gamma$ of the normal photographic paper is set at about 2.0. In the present embodiment, no $\gamma$ correcting circuit is included in the camera 30, but a single $\gamma$ correcting circuit which corrects the $\gamma$ to about 1 (0.45×2.0) is provided in the simulator. The $\gamma$ of the $\gamma$ correcting circuit and the value of $\gamma$ of the CRT together make the $\gamma$ of the entire system about 2.0. In this way, the characteristics of the CRT and those of the photographic paper are corrected at one time. Because of the use of the single correcting circuit, production costs are reduced. Since the $\gamma$ is set to about 1 by the $\gamma$ correcting circuit, the $\gamma$ is not substantially changed by the correction in the simulator, and the quality of the image on the CRT is thereby increased.

The camera 30 is connected to a simulator 34 through a gain control circuit 33. The image information detecting device 32 is connected to a slope control circuit 63 through a $\delta$, $\gamma$ correction circuit 38 and a printing system density calculating circuit 40. The above-described correction of color balance and density is performed by the printing system density calculating circuit 40 and the slope control circuit 63. A chromaticity meter 42 which acts as a measuring device is disposed in such a manner as to face the screen of the CRT 345 constituting one part of the simulator 34 to serve as a display device, and a chromaticity meter 44 faces the print copy 27. Both chromaticity meters 42 and 44 are connected to an I/O port 46 constituting a computer. A chromaticity meter may be used for both CRT screen and print copy. The computer which acts as a distance operating means and a parameter operating means comprises the I/O port 46, a CPU 48, a read-only-memory (ROM) 50, a random-access-memory (RAM) 52, a digital-analog (D/A) converter 54, analog-digital (A/D) converters 56, 58 and a bus 61 including data buses and control buses which interconnect these components. The computer is connected to the gain control circuit 33, the simulator 34, $\delta$, $\gamma$ correction circuit 38, the slope control circuit 63 which is connected to the printing system density calculating circuit 40, the driving circuit 26, and the driving circuit 29.

Figures 2, 3, 5:
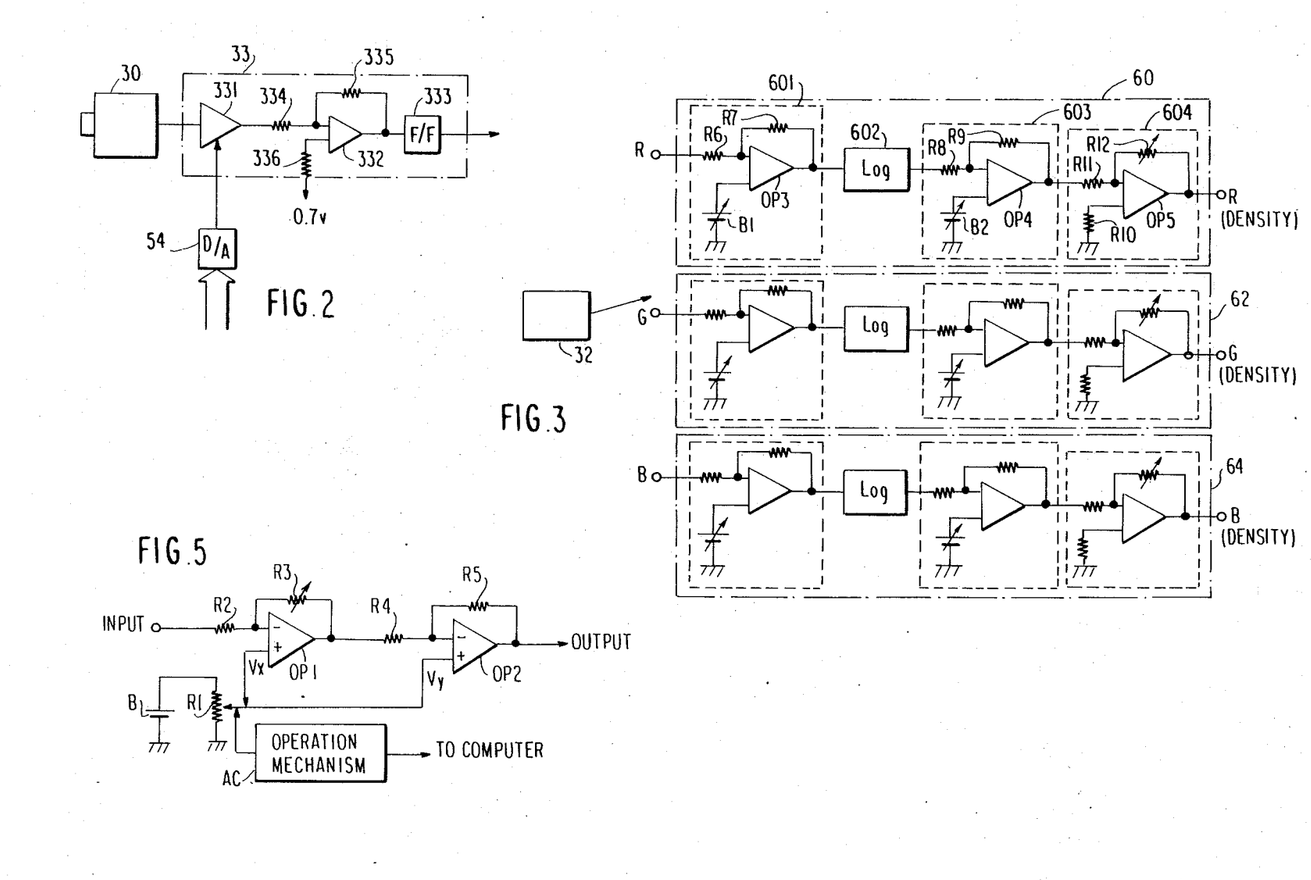
FIG. 2 is a circuit diagram of an example of a gain control circuit of FIG. 1.
FIG. 3 is a circuit diagram of an example of a compensation circuit of FIG. 1.
FIG. 5 is a circuit diagram of a second example of a negative/positive inversion circuit.

The gain control circuit 33, as shown in FIG. 2, includes an amplifier 331, an operational amplifier 332, a flip-flop 333, and resistors 334 to 336. A reference voltage (0.7 V which corresponds to the white level) is input to one of the inputs of the operational amplifier 332 through the resistor 336.

The gain of the camera 30 is adjusted by the gain control circuit 33 as follows: a plurality of standard, or reference, negatives (so called transparent negatives), each having a different negative size, which are obtained by developing non-exposed films, are supported on the negative carrier. Brightness is set to a standard, or reference, value for each negative by adjusting the iris, or the stop mechanism, of the camera. This adjustment of brightness is necessary because the mirror box 16 is converted, the magnification of the optical system 20 is changed, and the amount of light received by the camera 30 is thereby varied by changes in negative size. Subsequently, the each transparent negative is imaged by the camera 30, and the gain of the amplifier 331 is adjusted for each negative by delivering analog signals representing camera outputs for the three primary colors, red, green and blue, from the D/A converter 54. The output of the amplifier 331 is connected to the operational amplifier 332 which compares the output of the amplifier 331 with the reference voltage. The operational amplifier 332 outputs a signal to the flip-flop 333, only when the output of the amplifier 331 corresponds to the reference voltage. The output of the camera is set to the white level by stopping the adjustment of the gain when a signal is output by the flip-flop 333. Thus, the color balance can be adjusted with the output of the camera being set at the white level when the camera images the transparent negative (when the camera receives the maximum amount of light transmitted through the negative). The dynamic range of the camera can be thereby fully used, and the standard of the brightness can be easily and accurately determined. After the iris is adjusted such that the level of one of electrical signals representing red, green and blue(for example, the signal representing blue which has an intermediate wavelength) is at the white level, the gain is adjusted such that the levels of the remaining signals are at the white level. In this way, the iris and the gain can be easily adjusted.

In order to adjust the output of the camera using normal bull's eye, or eyeball, negatives having various negative sizes so as to adjust the color balance, a standard, or reference, amount of light is obtained by controlling the iris for each negative in the above-described manner, and the gain for each negative is controlled in the above-described manner so that the signals respresenting the red, green and blue primary colors, Which are produced by the camera, are at predetermined levels. If a normal negative formed from 35 mm film has ideal spectral characteristics, the densities of red; green and blue of the negative, excluding the base portion thereof, are respectively 0.26, 0.31 and 0.59. If the density of the base of the negative for each primary color is set to a value which is equal to 90% of the white level (0.7 V) of the camera, the gain is controlled such that the outputs of the camera for red, green and blue are respectively at 0.35 V, 0.31 V and 0.16 V. Each output of the camera thereby corresponds to the density of the negative. In a similar way to using a transparent negative, after the iris is adjusted such that the level of one of signals representing the three primary colors is at a predetermined level, the gain is controlled such that the levels of the remaining signals are at the predetermined levels. In this way, the iris and the gain can be easily adjusted.

The position of the camera iris and color balance position (camera output) which are obtained after the gain and the brightness have been adjusted in the above-described manner are digitally stored through channels for each type of negative or for negatives of each size (if the size of the negative is changed, the amount of light is varied by the difference in magnification), so that the iris position and the gain can be automatically switched over by simply switching over the channels when the size of the negative changes. The iris position of the camera and the color balance position thereof can be thereby switched over by simply switching over the channels, even if the type or size of the negative color film to be printed on the photographic paper changes. In this case, if the state of the light source shifts from the standard or the reference, that shift must be electrically compensated for. It is therefore preferable for the adjustment to be performed in the state of the light source in which the standard grey in the negative is also the standard, or reference, grey in the print copy.

In the above embodiment, the camera 30 is provided with the stop mechanism and is constituted such that the brightness is controlled by adjustment of the stop mechanism. In the present invention, of course, the camera 30 which is not provided with the stop mechanism can also be employed. In this case the brightness can be adjusted electrically by the adjustment of the gain of the electrical signal.

As shown in FIG. 3, the $\delta, \gamma$ correcting circuit includes a signal processing circuit 60 for converting the R signal produced by the image information detecting device 32 into a density signal and for $\delta, \gamma$ correcting that density signal, a signal processing circuit 62 for converting the G signal to a density signal and for $\delta, \gamma$ correcting that density signal, and a signal processing circuit 64 for converting the B signal to a density signal and for $\delta, \gamma$ correcting that density signal. Because the signal processing circuits 60, 62, 64 have the same structure, only the signal processing circuit 60 will be described below. The signal processing circuit 60 consists of an off-set correcting circuit 601, a logarithmic conversion circuit 602 for logarithmically converting the output of the off-set correcting circuit to a density signal, and a $\delta$ correcting circuit 603, and a $\gamma$ correcting circuit 604. The off-set correcting circuit 601 includes an operational amplifier OP3, resistors R6, R7, and a variable power supply B1. The $\delta$ correcting circuit 603 includes an operational amplifier OP4, resistors R8, R9, and a variable power source B2, and the $\gamma$ correcting circuit 604 includes an operational amplifier OP5, resistors R10, R11, and a variable resistor R12. The $\delta, \gamma$ correcting circuits 603, 604 outputs the corrected R, G and B signals.

The simulator 34 includes a logarithmic conversion device 341 connected to the output of the gain control circuit 33, a 3×3 matrix (two-dimensional square matrix) circuit 342 for correcting the difference between the density (integral density) viewed with the spectral sensitivity of the camera and that viewed with the spectral sensitivity of the photographic paper, a negative/positive inverting circuit 343 for converting the density of the negative to the analytic density of the photographic paper by the negative/positive inversion, a luminance signal converting circuit 344 for converting the analytic density of the photographic paper to the illuminant luminance of each color of the fluorescent substance of the CRT, and a CRT 345 for coloring the fluorescent substance in accordance with the output of the luminance signal converting circuit 344 so as to display the image imaged by the camera 30. These components are connected in series in that order.

The driving circuit 26 adjusts the color balance and the amount of light by moving each complementary color filter of the light adjusting filer 14 in the vertical direction. However, in the case of extremely overexposed or underexposed negative, reciprocity law failure is established, and density is reduced due to the underexposure even though the exposure is appropriate. To solve this problem, the CPU 48 takes the reciprocity law failure into consideration, and therefore computes the difference between the appropriate exposure and the present exposure and controls the opened time of the black shutter in such a manner that the exposure becomes longer in an amount which is equivalent to that difference. The increase in exposure time is then stored in the RAM 52.

Correction of Spectral Sensitivity of Received Light

The values obtained by logarithmically converting the B, G and R signals produced from the camera 30 by the logarithmic conversion circuit 341, i.e., the integral densities of the image in the negative color film viewed with the spectral sensitivity of the camera, $B'_{TV}$, $G'_{TV}$, and $R'_{TV}$, are converted into the analytical densities of the negative by using 3×3 matrix $A^{-1}$ (where $-1$ indicates an inverse matrix) as follows:

$$\begin{bmatrix} B_{TV} \\ G_{TV} \\ R_{TV} \end{bmatrix} = A^{-1} \begin{bmatrix} B'_{TV} \\ G'_{TV} \\ R'_{TV} \end{bmatrix} \quad (1)$$

The integral densities of the image in the negative color film viewed with the spectral sensitivity of the photographic paper, $B'_P$, $G'_P$, $R'_P$, are converted into the analytical densities of the negative by using 3×3 matrix $B^{-1}$, as follows:

$$\begin{bmatrix} B_p \\ G_p \\ R_p \end{bmatrix} = B^{-1} \begin{bmatrix} B'_p \\ G'_p \\ R'_p \end{bmatrix} \quad (2)$$

Since the analytical densities of the negative ($B_{TV}$, $G_{TV}$, $R_{TV}$) and ($B_P$, $G_P$, $R_P$), which are obtained by Expressions (1) and (2), are proportional, they can be expressed by the following Expression (3), using the diagonal matrix whose diagonal elements proportional constants:

$$\begin{bmatrix} B_p \\ G_p \\ R_p \end{bmatrix} = \begin{bmatrix} \alpha_B & 0 & 0 \\ 0 & \alpha_G & 0 \\ 0 & 0 & \alpha_R \end{bmatrix} \begin{bmatrix} B_{TV} \\ G_{TV} \\ R_{TV} \end{bmatrix} \quad (3)$$

Using Expressions (1) to (3), the relationship between ($B'_P$, $G'_P$, $R'_P$) and ($B'_{TV}$, $G'_{TV}$, $R'_{TV}$) is expressed as shown below, whereby the difference between the densities viewed with the spectral sensitivity of the TV and that of the photographic paper can be corrected, i.e., the density viewed with the spectral sensitivity of the TV is converted to the density viewed with the spectral sensitivity of the photographic paper.

$$\begin{bmatrix} B'_p \\ G'_p \\ R'_p \end{bmatrix} = B\ A^{-1} \begin{bmatrix} B'_{TV} \\ G'_{TV} \\ R'_{TV} \end{bmatrix} \quad (4)$$

where $$\alpha = \begin{bmatrix} \alpha_B & 0 & 0 \\ 0 & \alpha_G & 0 \\ 0 & 0 & \alpha_R \end{bmatrix}$$

The matrix elements, B, $\gamma$ and A, can be obtained beforehand for each standard negative sample with the coloring characteristics of that negative and the spectral sensitivity characteristics of the photographic paper and camera taken into consideration, and is set in the 3×3 matrix circuit 342 which will be described below.

$$B \cdot \alpha \cdot A^{-1} = \begin{bmatrix} K_{11} & K_{12} & K_{13} \\ K_{21} & K_{22} & K_{23} \\ K_{31} & K_{32} & K_{33} \end{bmatrix} \quad (5)$$

Negative-positive Inversion

The N/P inversion circuit 343 is a circuit which converts $\gamma$ to $-\gamma$. It converts the output of the 3×3 matrix circuit with respect to the following straight line:

$$y - y_1 = a(x - x_1) \quad (6)$$

where $x_1$, $y_1$ are the coordinates of a point which is not affected by the negative-positive inversion (hereinafter referred to as a pivot point), x, y are the coordinates of the density region, and a is a constant which represents the gradation at the time of the N/P inversion and which is generally a negative value.

The pivot point is a point whose density must not be changed at the negative-positive inversion, i.e., a point of the level of the neutral grey (standard grey). In a camera or TV, all the levels are between 0 and 0.7 V. The black level of the camera is logarithmically transformed into $-$. That is, when the logarithm of the video signals is taken, the 0 of the black level becomes $-$. This cannot be displayed on the CRT when negative and positive have been inverted. This means that the black level cannot be inverted to the white level accurately. Accordingly, it is preferable for the negative/positive inversion to be performed with the pivot point set to the neighborhood of 23% of the white level of the camera output $V_{in}$ (0.63, which is the density of the negative excluding its base portion).

Figure 4:
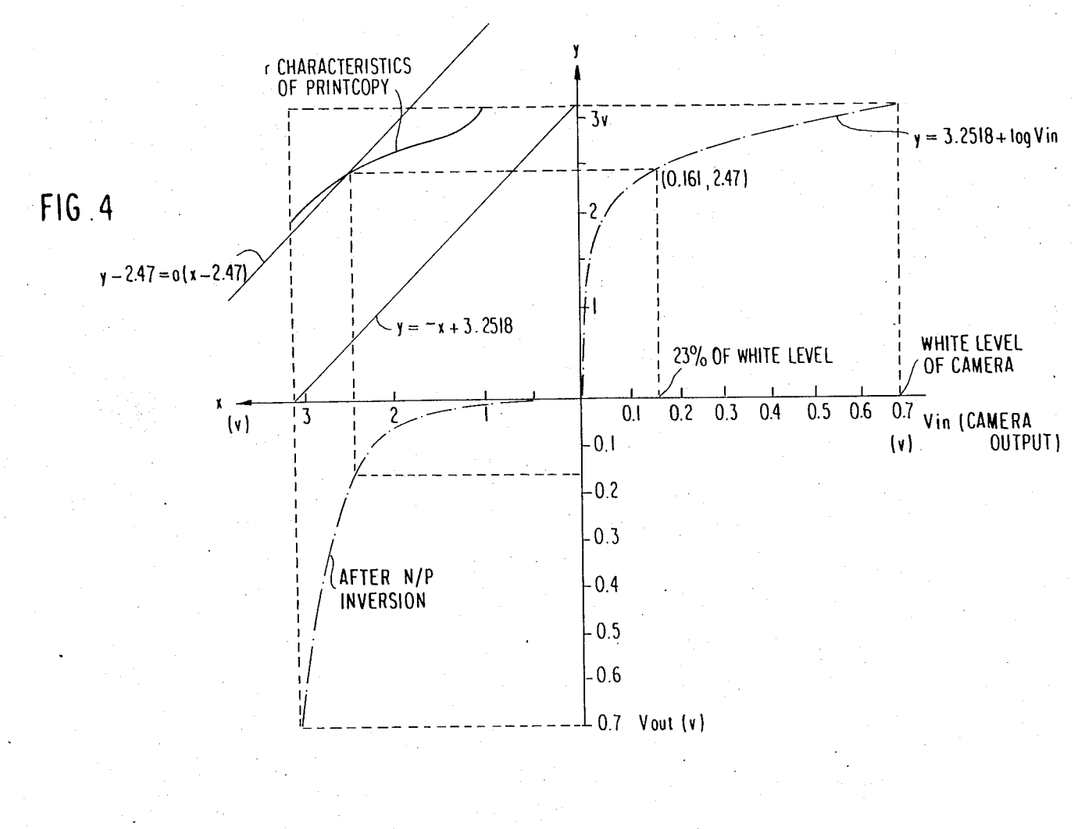
FIG. 4 is a diagram to be used to explain the process of the negative/positive inversion.

FIG. 4 shows the relationship between the camera output $V_{in}$ and the output $V_{out}$ of the negative/positive inversion circuit 343 at negative/positive inversion with the pivot point set to 23% of the white level of the camera output $V_{in}$. The white level of the camera output is 0.7 V, and 23% of the white level is therefore 0.161 V. When the output of the 3×3 matrix circuit 342 is expressed by the following expression:

$$y = 3.2518 + \log V_{in} \quad (7)$$

the coordinates corresponding to 23% of the white level is (0.161, 2.47). When the curve expressed by Expression (7) is transformed in accordance with the straight line which passes through the point (2.47, 2.47) and which is expressed by:

$$y - 2.47 = a(x - 2.47) \quad (8)$$

the output of the 3×3 matrix circuit 342 is subjected to negative/positive inversion, as shown by the curve in FIG. 4. As can be seen from FIG. 4, the value which is 23% of the white level of the camera output remains the same after the negative/positive inversion.

The negative/positive inversion may be performed with the circuit constructed shown in FIG. 5 and with a pivot point obtained in a manner described below. The circuit shown in FIG. 5 includes an operational amplifier OP1, an operational amplifier OP2, a variable resistor R1 used to set the reference voltage $V_x$, $V_y$ (which corresponds to the pivot point) of the operational amplifiers, and an operation mechanism AC which varies the reference voltage by moving the contact of the variable resistor R1. A signal is input to the inversion input of the operational amplifier OP1 through a resistor R2, and a variable resistor R3 is connected between the inversion input of the operational amplifier OP1 and is output so as to adjust the gain thereof. The output of the operational amplifier OP1 is connected to the inversion input of the operational amplifier OP2 through a resistor R4. A risistor R5 is connected between the inversion input of the operational amplifier OP2 and its output. One of the leads of the variable resistor R1 is grounded, and the other lead thereof is grounded through a power source B. The contact of the variable resistor R1 is respectively connected to the non-inversion inputs of the operational amplifiers OP1, OP2.

Using the thus-arranged circuit, the pivot point will be obtained as follows: the negative color film which is colored in standard grey is supported on the negative carrier. The negative is imaged by the camera, and is displayed on the screen of the CRT after it has been negative/positive inverted by the circuit shown in FIG. 5. Next, a standard grey signal is electrically produced (by setting the output of the CRT at a value which is 23% of the white level of the CRT), and that signal is displayed on the CRT screen adjacent to the image in the above negative. The reference voltage, $V_x$, $Y_y$, is then varied by changing the resistance of the variable resistor R1 continuously by the operation of the key board so as to match the image displayed by imaging the negative which is colored in the standard grey and the image reproduced by the electrically produced standard grey signal. The pivot point is thereby determined.

When the above described circuit is used, grey level can be set by the sense of an operator. Accordingly, it is possible to set the grey level which is to be provided on a print copy. This enables a very accurate simulation which is not affected by the developing conditions (such as the fatigue of the developer, change in the quality of the developer due to the change in temperature).

Correction of Coloring Spectral Sensitivity Characteristics

Since the CRT employs illuminant substances to display images, the luminance of the CRT is proportional to the voltage. On the other hand, the photographic paper (the print copy) employs absorbing substances (dyes). As a result, the luminance is not proportional to the amount of dye but the logarithm thereof is proportional to the amount of dye, and as the amount of dye changes, the chromaticity point thereof varies. This means that the dyes of the photographic paper are unstable primary colors (cyan, yellow, magenta) having chromaticity points which change in accordance with the amount of dye.

The luminance signal conversion circuit 344 converts the output D of the negative/positive circuit 343 to the illuminant luminance signal T for each color of the CRT on the basis of the following expression, and outputs the results to the CRT 345.

$$T = F(\log^{-1}(f(D))) \quad (9)$$

where f is a function to be used when the output D is converted to the integral density, and F a function to be used to transform the integral transmittance $\log^{-1}(f(D))$ to the illuminant luminance signal.

These functions, F, f, can be determined by determining the optimum values of the output D and the illuminant luminance signal T beforehand and by performing the optimization by the method of least squares or regression. A 3×3 matrix is generally employed to obtain the functions F, f.

The CRT is controlled by the luminance signals obtained in the above-described manner by the luminance signal conversion circuit 344, so that it displays the images having coloring characteristics which correspond to those of the photographic paper (print copy).

When the exposure time is changed due to reciprocity law failure, that change in the exposure time is read out from the RAM 52 to adjust the output of the D/A converter 54, thereby changing the gain of the camera (when the exposure time is elongated, the gain is increased before the negative/positive inversion, while it is decreased before the negative/positive inversion when the exposure time is shortened). In this way, the images which are to be formed in a print copy can be displayed on the CRT. The gain is returned to its original value when the reciprocity law is established. At this time, a mark is displayed at a predetermined position on the CRT to indicate that the gain of the camera has been changed.

In the above-described method, change in the exposure time is corrected by controlling the gain of the camera, However, it may be adjusted by correcting the elements of the matrix set in the 3×3 matrix circuit.

Determination of Parameters

The parameters which are set in the 3×3 matrix circuit 342 and luminance signal conversion circuit 344 are determined as follows:

To determine the elements of the matrix in the expression (5), the standard negative of color chart consisting of a plurality of standard colors (hereinafter referred to as a Macbeth negative) is imaged by the camera, and the data obtained by logarithmically transforming the camera output of each block of the Macbeth negative is input. On the other hand, the spectral density of each block of the Macbeth negative is measured, and the printing density of a print copy is calculated to obtain theoretical values using the measured spectral density and spectral sensitivity of the photographic paper. Optimization is then performed by the CPU 48 by the method of least squares, such that the data representing each block of the Macbeth negative matches the theoretical values. In determining the elements of the 3×3 matrix, the number of samples of particular colors (e.g., skin color, grey and other colors) may be increased. Weighting may be performed on these samples, and the data on these samples are made coincide with the theoretical values.

When the tristimulus values of the photographic paper and the integral transmittances thereof are X, Y, Z and $T_R$, $T_G$, $T_B$, respectively, $$\begin{bmatrix} X \\ Y \\ Z \end{bmatrix} = \begin{bmatrix} X_R X_G X_B \\ Y_R Y_G Y_B \\ Z_R Z_G Z_B \end{bmatrix} \begin{bmatrix} T_R \\ T_G \\ T_B \end{bmatrix} \quad (10)$$

The tristimulus values of the CRT, X', Y', Z', are related to the electrical signals (theoretical values), $T_{R}'$, $T_{G}'$, $T_{B}'$, which are to be supplied to the CRT as follows:

$$\begin{bmatrix} X' \\ Y' \\ Z' \end{bmatrix} = \begin{bmatrix} X'_R X'_G X'_B \\ Y'_R Y'_G Y'_B \\ Z'_R Z'_G Z'_B \end{bmatrix} \begin{bmatrix} T_R' \\ T_G' \\ T_B' \end{bmatrix} \quad (11)$$

If the tristimulus values X, Y, Z are equal to the tristimulus values X', Y', Z', the electrical signals to be supplied to the CRT are obtained using Expressions (10), (11) as follows:

$$\begin{bmatrix} T_R' \\ T_G' \\ T_B' \end{bmatrix} = \begin{bmatrix} X'_R X'_G X'_B \\ Y'_R Y'_G Y'_B \\ Z'_R Z'_G Z'_B \end{bmatrix}^{-1} \begin{bmatrix} X_R X_G X_B \\ Y_R Y_G Y_B \\ Z_R Z_G Z_B \end{bmatrix} \begin{bmatrix} T_R \\ T_G \\ T_B \end{bmatrix} \quad (12)$$

$$\begin{bmatrix} X_R X_G X_B \\ Y_R Y_G Y_B \\ Z_R Z_G Z_B \end{bmatrix} \begin{bmatrix} T_R \\ T_G \\ T_B \end{bmatrix}$$

in the expression (12) is equal to the tristimulus values of the photographic paper in accordance with Expression (10), and is therefore obtained by measuring the chromaticity points of the print copy 27 using the chromaticity meter 44.

The elements of the inverse matrix in Expression (12) can be determined as follows: the tristimulus values of the CRT are obtained by measuring the chromaticity points by the chromaticity meter 42. Next, $X'_R$, $Y'_R$, $Z'_R$ at $T'_G = T'_B = 0$ and when $T'_R$ is at a certain voltage value are obtained from Expression (11). Similarly, $X'_G$, $Y'_G$, $Z'_G$ at $T'_R = T'_B = 0$ and when $T'_R$ is at a certain voltage value are obtained. $X'_B$, $Y'_B$, $Z'_B$ at $T'_R = T'_G = 0$ and when $T'_B$ is at a certain voltage value are obtained. The electrical signals which are to be supplied to the CRT, i.e., the theoretical values, can be thereby determined from Expression (12).

The values of the elements of the 3×3 matrix circuit 342 which are determined in the above-described manner are multiplied by $-\gamma$ to obtain the output D of the negative/positive circuit 343 (the input of the luminance signal conversion circuit 344). This D is optimized by the method of least squares or regression using the theoretical values ($T'_R$, $T'_G$, $T'_B$) on the basis of Expression (9) to determine the parameters of the functions, F, f. In determining the parameters, particular colors (e.g., skin color and grey) are weighted, and the signals representing these colors are made to agree with the theoretical values.

The sum of the differences in the hue of the respective standard colors of the image in the standard print copy and of the respective standard colors of the image in the simulator, the sum of the differences in the saturation of the respective standard colors of both images, and the sum of the differences in the lightness of the respective standard colors of both images are thereby minimized. As a result, the differences in the hue of the images on the CRT and on the print copy, the differences in the saturation of both images, and the differences in the lightness of both images are minimized. If the above parameters are determined periodically, or if the parameters are determined for each type of photographic paper and are stored in the RAM, simulation with high accuracy is enabled even when the development characteristics vary due to the the developer's fatigue or a change in the temperature of the developer, or when the characteristics of the photographic paper vary, and the image on the CRT can be the same as that of the print copy.

In the above operations, the differences in the chromaticity point and lightness are expressed quantitatively by the geometrical distances between the points corresponding to the respective standard colors in the print copy and the points corresponding to the respective standard colors on the CRT in the L* a* b* color space.

In the above described example, the differences in the hue, saturation, and lightness are minimized. However, the parameters may also be determined such that the sum of the differences in the hue and lightness only, or the hue and saturation only, or the lightness and saturation only of respective colors, or again the sum of differences in only one of the three color properties of respective colors, are minimized.

For example, the parameters may be determined such that the sum of distances of the chromaticity points of the respective standard colors of the images in the standard print copy and in the simulator in the chromaticity diagram are minimized and that the differences in hue and saturation of the images on the CRT and in the print copy are minimized. In the above operations, the differences in chromaticity point are expressed quantitatively by the geometrical distances between the points corresponding to the respective standard colors in the print copy and the points corresponding to the respective standard colors on the CRT in the chromaticity diagram.

The parameters may be determined such that the differences in the lightness of the respective colors which are shown in the coordinates perpendicular to the chromaticity diagram are also minimized.

Two chromaticity meters are employed in the above example. However, only one chromaticity meter may be switched over for measurement.

Figure 6:
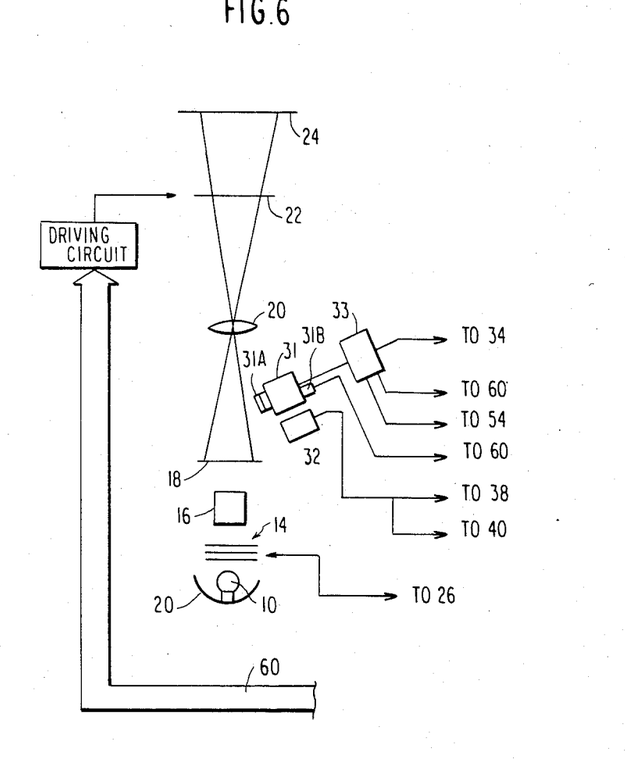
FIG. 6 is a block diagram of a second embodiment of the present invention.

Referring to FIG. 6, a second embodiment of this invention will be described in which a single-board camera is employed. The same reference numerals are used to denote members or parts which are included in the first embodiment shown in FIG. 1, and description thereof is omitted.

As shown in FIG. 6, adjacent to the optical system 20 of the negative color film 18 is disposed a camera 31 comprising a single-board camera which has a color filter array for breaking down the received light into three primaries, R (red) light, G (green) light, and B (blue) light, as well as a stop mechanism (iris), and which outputs the R, G and B signals in time sharing. Also disposed adjacent to the optical system 20 is the image information detecting device 32 including a two-dimensional image sensor for detecting the image density information on the R, G, and B primaries. The two-dimensional image sensor is constructed by a CCD (charge coupled device).

Figure 7:
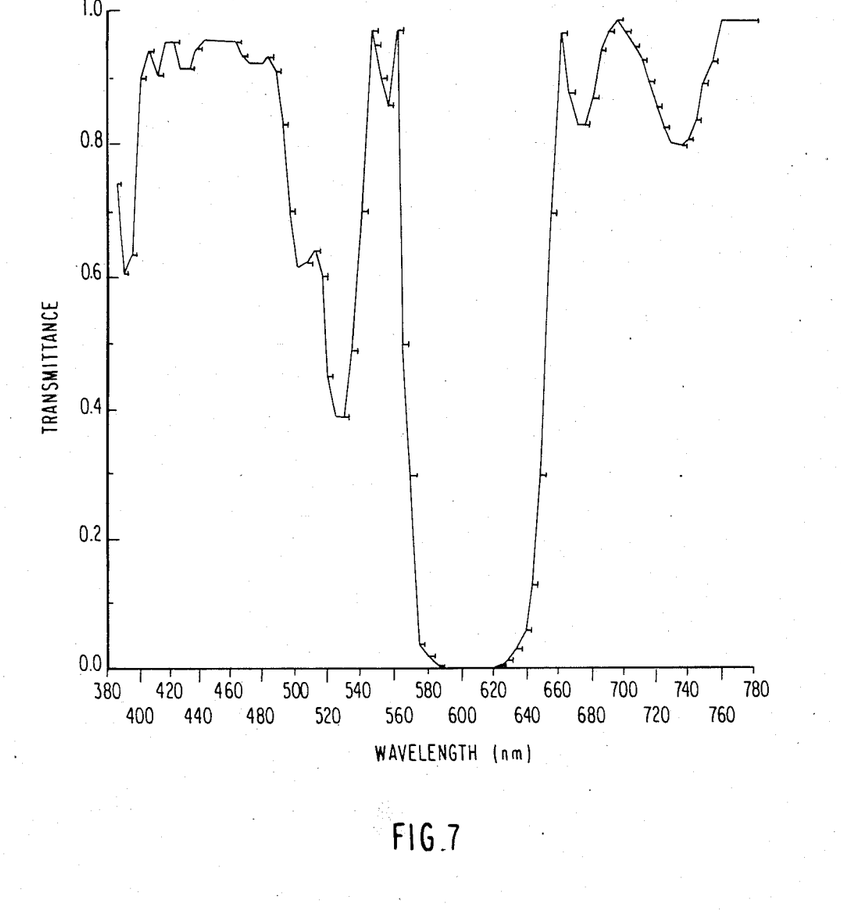
FIG. 7 shows the spectral transmittance characteristics of a filter employed in the second embodiment.
Figure 8:
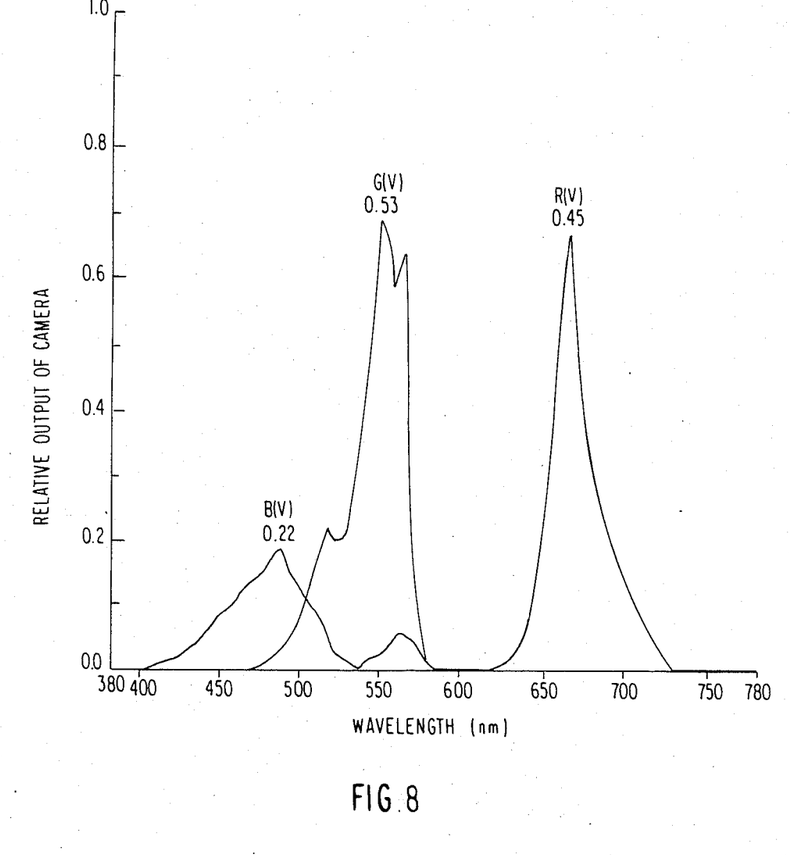
FIG. 8 shows the spectral output curves of a camera with the filter of FIG. 6.
Figure 9:
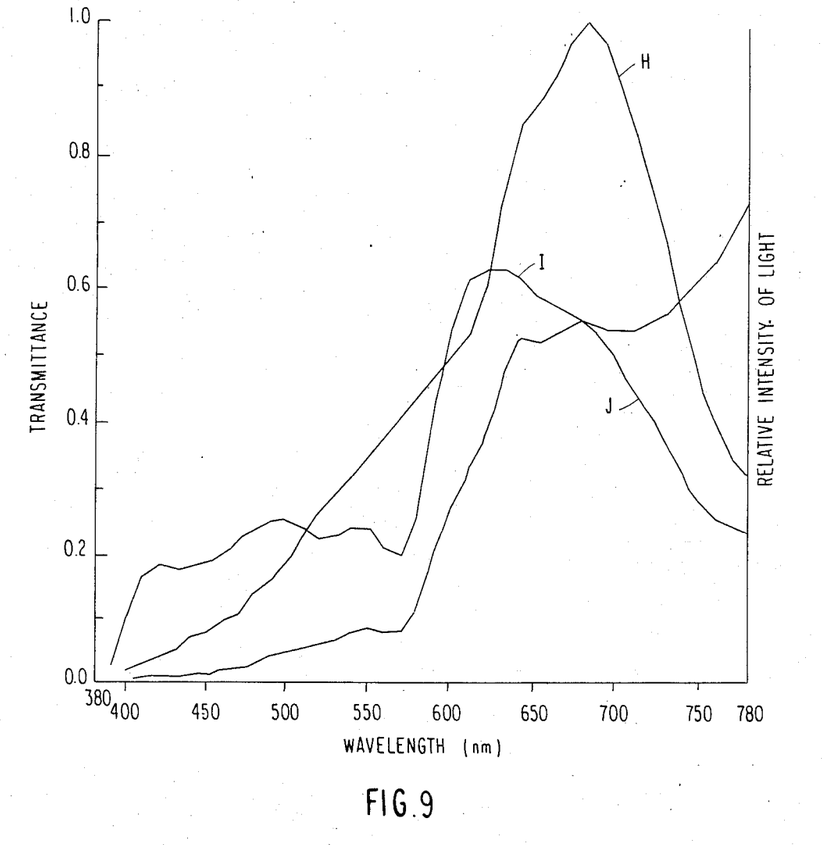
FIG. 9 shows the spectral curves of the spectral intensity of a light source, the spectral absorption of the base portion of a negative, and the products of the spectral intensity of the light source and the spectral absorption of the base portion.
Figure 10:
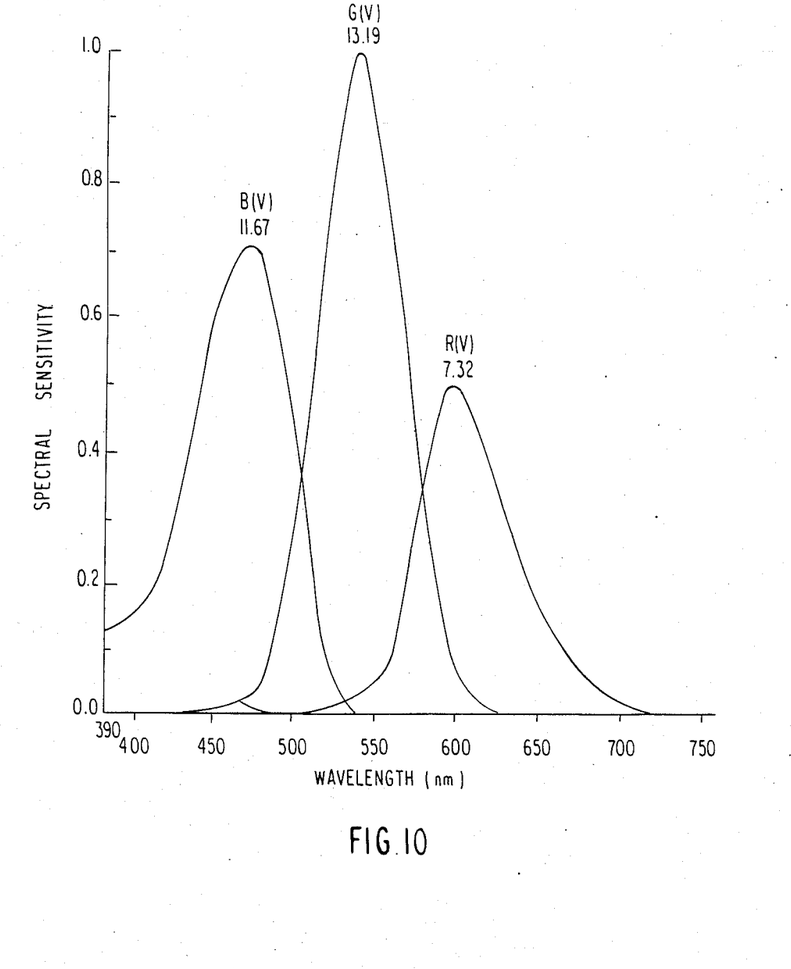
FIG. 10 shows the spectral output curve of a camera only.

The single-board camera 31 includes: a color filter array including a solid-state image sensor and a mosaic filter in which tiny filters of the three primaries R, G, and B are disposed on the solid-state image sensor in a mosaic form, or a solid-state image sensor and a stripe filter; a crystal filter for preventing Moire; an infrared ray preventing filter; and a filter 31A which constitutes the present invention, these filters being laminated in that order. The single-board camera outputs R, G, and B signals in time sharing in response to the clock. FIG. 7 shows the absorption characteristics of the filter 31A employed in this invention. As will be clear from FIG. 7, the filter absorbs light having a wavelength of about 500 nm or 600 nm to a great extent. It also shows a transmittance of 10 % or less with respect to light having a wavelength between 580 nm and 630 nm. FIG. 8 shows the spectral characteristics of a single-board camera with this filter mounted thereon, i.e., the relative output thereof in terms of wavelength (the spectral output of the camera including the light source). As can be seen in FIG. 8, the peak wavelength of the red light R is approximately 660 nm, and deviates toward the longer wavelength relative to the red light R in the case of the single-board camera shown in FIG. 10 which is not provided with the filter 31A. The peak wavelength of the red light R in the case of the single-board camera with the filter substantially matches the peak wavelength of the R obtained by coloring the cyan coloring material in the negative - light source system, which is shown by the curve J in FIG. 9. The color formed by coloring the cyan coloring material can be thereby detected accurately. Since the filter absorbs light having a wavelength of about 500 nm or about 600 nm to a great extent and has a transmittance of 10% or less with respect to light having a wavelength between 580 nm and 630 nm, the red light R and the green light G are not mixed to any substantial extent. The degree of mixture of green light G and blue light B is also decreased compared with the case of the single-board camera shown in FIG. 10. The intensities of the red light R and the green light G are substantially the same. Although the intensity of the blue light B is smaller, it is originally small, as can be seen in FIG. 9, and practically no problem is caused.

Since the peak wavelength of the red light deviates toward the longer wavelength and the degree of mixture of the three primary colors is lowered, better color reproduction is enabled. Since the red light and green light have substantially the same intensities, better color balance is ensured. To produce this filter, the characteristic curve shown in FIG. 7 is first obtained such that the chromaticity of the positive image which is obtained by displaying the image in the negative color film by the simulator is close to the chromaticity of the image in the print copy prepared from this negative color film by the automatic photographic printing apparatus, and the amounts of the dyes of respective colors, R, G, and B are then adjusted so that they show the characteristics shown by the characteristic curve. The camera 31 is provided with a position detector 31B constructed by a potentiometer for detecting the position of the iris. The potentiometer 31B is connected to the computer.

The other structures and functions are the same as those of the first embodiment.

What is claimed is:

1. An automatic photographic printing apparatus in which light from a light source which undergoes a light adjustment conducted by an automatic exposure control function of said automatic photographic printing apparatus is irradiated onto a negative color film and photographic paper is exposed by the light transmitted through the negative film so as to optically form an image therein onto the photographic paper, said automatic photographic printing apparatus being provided with a simulator for displaying the image in the negative color film as a positive image, comprising:

an imaging device disposed on the side of said negative color film spacedly from the light source for imaging the image in said negative color film on said side while said negative color film is being illuminated by said automatically adjusted light of the light source under said automatic exposure control function, said adjusted light being simultaneously used in both said printing apparatus for forming said image of the negative film on said photographic paper and said imaging device for simulating the image thereof;

a display device for displaying the image obtained, as a positive image by said imaging device;

an image information processing unit for electrically converting the output of said imaging device such that the coloring characteristics of said display device matches those of said photographic paper substantially and for causing said display device to display the results.

2. An automatic photographic printing apparatus according to claim 1, wherein said imaging device has a filter by which the chromaticity of the positive image displayed on said display device becomes closer to that of the image in the print copy obtained from the photographic paper exposed.

3. An automatic photographic printing apparatus according to claim 2, wherein said filter is constructed such that it deviates the peak wavelength of red light in the output of said imaging device toward the longer wavelength side.

4. An automatic photographic printing apparatus according to claim 3, wherein said filter absorbs light having a wavelength of about 500 nm or about 600 nm to a great extent.

5. An automatic photographic printing apparatus according to claim 4, wherein said filter has a transmittance of 10% or less to light having a wavelength between 580 nm and 630 nm.

6. An automatic photographic printing apparatus according to claim 1, further including: a chromaticity meter for measuring the chromaticity of a reference print which is prepared by exposing under a fixed state of said light source the image of a reference negative color film having a plurality of different reference colors onto the photographic paper and by developing that exposed photographic paper, as well as the chromaticity of the image in said reference negative color film which is displayed on said display device; and a parameter operating means for calculating the values of parameters at which the sum of distances in the chromaticity diagram between the chromaticities of respective reference colors of the image in said reference print and the chromaticities of corresponding respective reference colors of the image on said display device is minimized.

7. An automatic photographic printing apparatus according to claim 6, wherein said parameter operation means is constituted so as to perform weighting on at least one certain particular reference color, and then calculate the values of parameters at which the sum of said distances is minimized.

8. An automatic photographic printing apparatus according to claim 7, wherein said chromaticity meter is constituted so as to perform measurement at the monochromatic coloring of red, green, or blue.

9. An automatic photographic printing apparatus according to claim 1, further including: a measuring device for measuring the coloring characteristics of the reference print obtained by exposing a reference negative film on the photographic paper and by developing that photographic paper; operating means for performing calculation by optimization with the objective value set at the amount of coloring of said reference print; and correcting means for correcting the parameters of said simulator on the basis of the results of the calculation of said operating that the positive image displayed on said display device substantially matches the positive image in said reference print.

10. An automatic photographic printing apparatus according to claim 1, wherein said imaging device is a camera, and said display device is a CRT.

11. An automatic photographic printing apparatus according to claim 10, wherein said image information processing unit includes a logarithmic conversion means for logarithmically converting the signals output from said camera, a 3×3 matrix means for correcting the differences between the density viewed with the spectral sensitivity of the camera and that viewed with the spectral sensitivity of the photographic paper, a negative/positive inversion means for converting the density of the negative to the analytic density of the photographic paper by the negative/positive inversion, and a luminance signal conversion means for converting the analytic density of the photographic paper to the illuminant luminance of each color of fluorescent substance of said CRT and outputting the results to said CRT.

12. A method of correcting a simulator provided in an automatic photographic printing apparatus for exposing onto photographic paper an image in a negative color film by irradiation of light adjusted by an automatic exposure control function of said automatic photographic printing apparatus, said simulator imaging the negative color film irradiated by said adjusted light and displaying on a display device the image which is to be formed on said photographic paper as a positive image, comprising the step of:
correcting the γ characteristics of said display device and those of said photographic paper at one time.

13. A method of correcting a simulator provided in an automatic photographic printing apparatus for exposing an image in a negative color film on a photographic paper by irradiation of light adjusted by an automatic exposure control function of said automatic photographic printing apparatus, said simulator having an imaging device provided with means for controlling the amount of light for imaging the image in the negative color film by irradiation of said adjusted same light through the imaging device, said imaging device resolving the irradiated and received light into three primary colors and outputting electrical signals corresponding to said three primary colors, said simulator converting the output of said imaging device into the image and displaying the image as a positive image, comprising the steps of:
imaging an image on a reference negative film by using said imaging device; and
adjusting gain of said electrical signals for corresponding the output of said imaging device to density of said reference negative film.

14. A method of adjusting a simulator according to claim 13, further comprising the steps of:
imaging an image in a transparent negative film obtained by developing a non-exposed film as said reference negative film by said imaging device; and
adjusting brightness by adjusting said control means for the amount of light and adjusting the gain of said electrical signals such that all of the outputs of said imaging device have a value corresponding to the white level.

15. A method of adjusting a simulator according to claim 13, comprising the steps of:
using a bull's eye negative film as said reference negative film comprising a first center portion of a grey subject and a second peripheral portion of a yellow green subject surrounding said first portion;
imaging an image of said reference negative film by said imaging device;
adjusting brightness of said reference film by adjusting said control means for the amount of light; and
adjusting the gain of said electrical signals such that all of the outputs of said imaging device become predetermined values.

16. A method of adjusting a simulator according to claim 13, comprising the steps of:
adjusting said control means for the amount of light and the gain of said electrical signals such that the output of said imaging device corresponds to the density of each of various reference negative films, each having a different size;
imaging an image of said reference negative films;
storing the adjusted position of said control means for the amount of light and the adjusted gain of the electrical signals for each negative size; and
adjusting said control means for the amount of light and said gain on the basis of the stored information whenever the size of said reference negative color film changes.

17. A method of adjusting a simulator according to claim 16, wherein said reference negative film is a transparent negative film obtained by developing a non-exposed film, brigtness is adjusted by adjusting said control means for the amount of light, and the gain of said electrical signals is adjusted such that all the outputs of said imaging device have a value corresponding to the white level.

18. A method of adjusting a simulator according to claim 16, wherein said reference negative film is a bull's eye negative film comprising a first portion corresponding to a negative film of a grey subject and a second portion corresponding to a negtative film of a yellow green subject and surrounding said first portion, the brigtness is adjusted by adjusting said stop mechanism, and the gain of said electrical signals is adjusted such that all the outputs of said imaging device have a value corresponding to the white level.

19. A method of adjusting a simulator provided in an automatic photographic printing apparatus for exposing an image in a negative color film on a photographic paper by irradiation of light adjusted by an automatic exposure control function of said automatic photographic printing apparatus, said simulator having an imaging device for imaging the negative color film by irradiation of said adjusted same light through the imaging device, said imaging device resolving the irradiated and received light into three primary colors and outputting electrical signal corresponding to said three primary colors, said simulator converting the output of said imaging device into the image and displaying it as a positive image, comprising the steps of:
imaging an image on a reference negative film by using said imaging device; and
adjusting gain of said electrical signals for corresponding the output of said imaging device to density of said reference negative film.

20. A method of adjusting a simulator according to claim 19, further comprising the steps of: an image in a transparent negative film obtained by developing a non-exposed film as said reference negative film by said imaging device; and adusting brightness electrically and adjusting the gain of said electrical signals such that all of the outputs of said imaging device have a value corresponding to the white level.

21. A method of adjusting a simulator according to claim 19, comprising the steps of:
- using a bull's eye negative film as said reference negative film comprising a first center portion corresponding to a negative film of a grey subject and a second peripheral portion of a yellow green subject surrounding said first portion;
- imaging and image of said reference negative film by said imaging device;
- adjusting brightness of said reference film electrically; and
- adjusting the gain of said electrical signals such that all of the outputs of said imaging device become predetermined values.

22. A method of adjusting a simulator according to claim 19, comprising the steps of:
- adjusting the gain of said electrical signals such that the output of said imaging device corresponds to the density of each of various reference negative films, each having a different size;
- imaging an image of said reference negative films;
- storing the adjusted gain of the electrical signals for each negative size; and
- adjusting said gain on the basis of the stored information whenever the size of said reference negative color film changes.

23. A method of adjusting a simulator according to claim 22, wherein said reference negative film is a transparent negative film obtained by developing a non-exposed film, brightness is adjusted electrically, and the gain of said electrical signals is adjusted such that all the outputs of said imaging device have a value corresponding to the white level.

24. A method of adjusting a simulator according to claim 22, wherein said reference negative film is a bull's eye negative film comprising a first portion corresponding to a negative film of a grey subject and a second portion corresponding to a negative film of a yellow green subject and surrounding said first portion, the brightness is adjusted electrically, and the gain of said electrical signals is adjusted such that all the outputs of said imaging device have a value corresponding to the white level.

* * * * *